Feb. 6, 1945. L. C. BOWLING 2,368,741
MOTOR STEERING APPARATUS
Filed Aug. 26, 1943 2 Sheets-Sheet 1
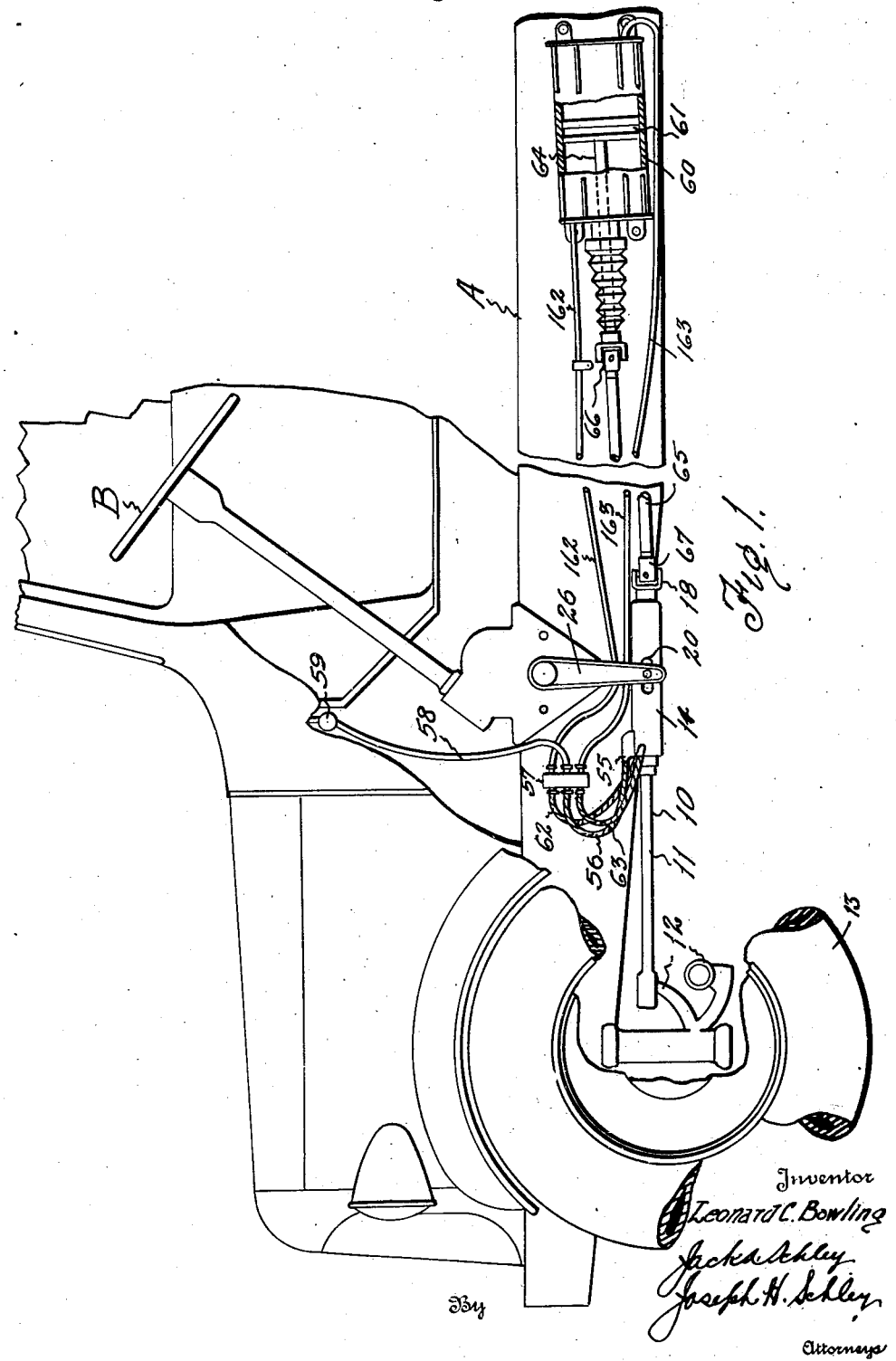

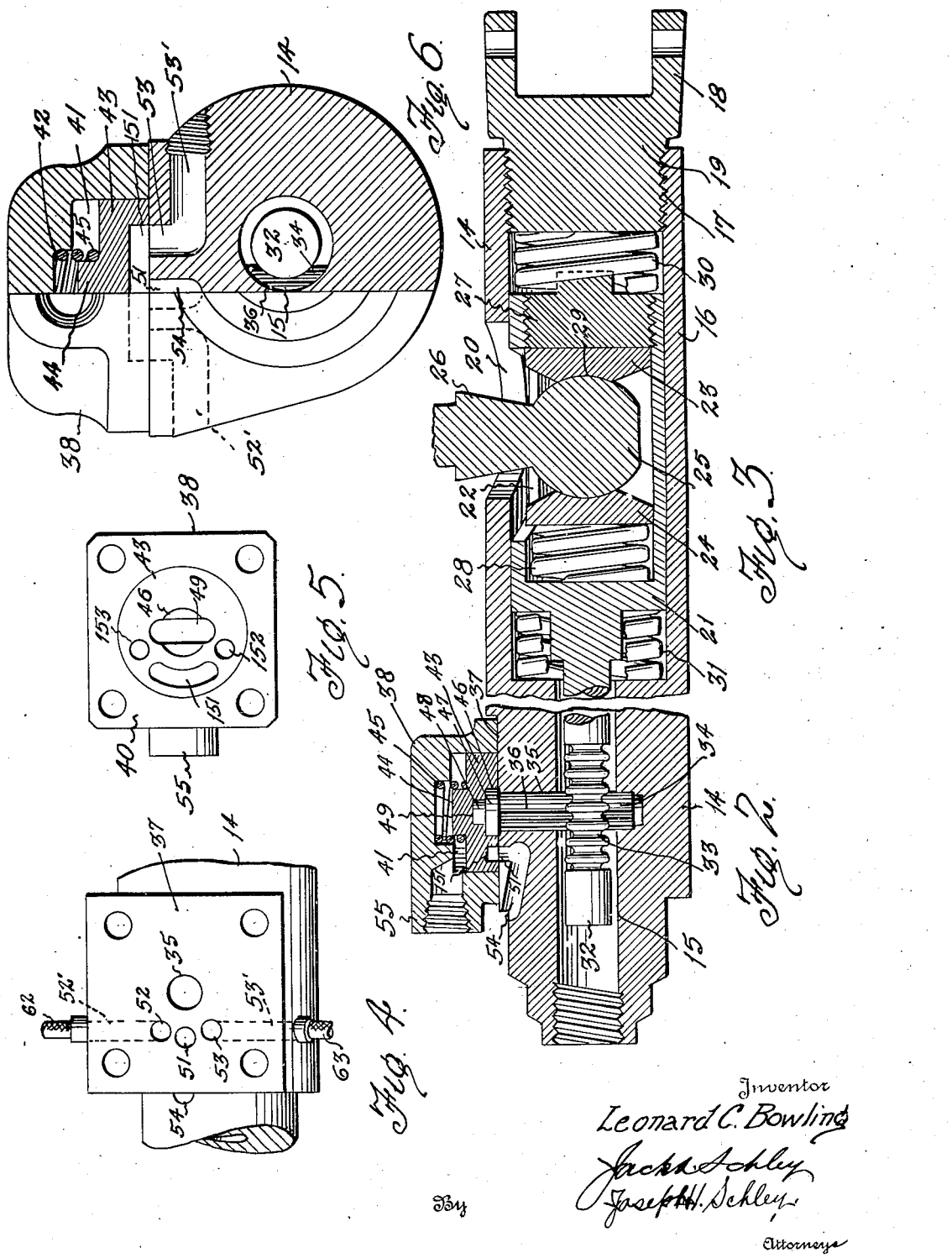

Patented Feb. 6, 1945

2,368,741

UNITED STATES PATENT OFFICE 2,368,741

MOTOR STEERING APPARATUS

Leonard C. Bowling, Houston, Tex., assignor of one-half to Lee O. Koen, Houston, Tex.

Application August 26, 1943, Serial No. 500,156

7 Claims. (Cl. 180—79.2)

This invention relates to new and useful improvements in motor steering apparatus.

One object of the invention is to provide an improved power steering apparatus, either air or hydraulic wherein the manual operation is substantially confined to the actuation of simple control means, preferably incorporated in the drag link, whereby the steering load imposed upon the driver is more or less minimized and efficient and safe steering is accomplished with the expenditure of little energy.

Another object of the invention is to provide an improved steering apparatus wherein the resistance offered by the frictional contact of the front-wheel tires with the street or road surface which is opposed to the torque generated by turning the steering wheel, is utilized to operate the power control to supply power to actually turn said wheels, whereby the apparatus is made sensitive to manual manipulation and the steering is responsive to the varying forces applied by the driver in turning the steering wheel, thus placing the steering under complete control at all times.

A further object of the invention is to provide an improved steering apparatus wherein a given turn of the steering wheel will cause operation of the power steering means, but which operation will be automatically equalized and the power steering control returned to neutral unless the driver continues to apply turning-force or torque to the steering wheel.

An important object of the invention is to provide an improved drag link for a power steering apparatus, which link has incorporated therein, pressure-responsive means for controlling the supply of fluid to the power supply means thus making it possible to convert an ordinary power steering apparatus, simply by connecting the improved drag link therein and adjusting the fluid connections thereto.

Still another object of the invention is to provide an improved drag link having a fluid control element and means, movable independently of the link proper, for actuating the fluid control element.

A further object of the invention is to provide an improved drag link carrying a fluid control valve and resiliently sustained movable means for positively operating said valve from the steering wheel and automatically operating said valve in reaction to resistance offered by the front wheels and steering mechanism attached to the drag link.

A construction designed to carry out the invention will be hereinafter described together with other features of the invention.

The invention will be more readily understood from a reading of the following specification and by reference to the accompanying drawings, wherein an example of the invention is shown, and wherein:

Figure 1 is a fragmentary side view of a motor vehicle equipped with a power steering apparatus constructed in accordance with the invention, Figure 2 is an enlarged longitudinal sectional view of the forward portion of the drag link casing showing the air control means, Figure 3 is an enlarged longitudinal sectional view of the forward portion of the drag link, taken at a right angle to Figure 2, and showing the independently movable plunger, Figure 4 is a plan view showing the valve seat, Figure 5 is an underside view of the valve cap and valve disk, and Figure 6 is a further enlarged front end view of the casing, partly in elevation and partly in section.

In the drawings, the numeral 10 designates a drag link, the forward portion 11 of which may be of any suitable construction, according to the particular motor vehicle upon which the link is installed. As the invention resides more particularly in other elements, the usual steering connections to which the forward portion 11 is connected, will not be described in detail, but designated as the steering linkage 12 and the front wheels 13, to which said linkage is connected according to the manufacture of the vehicle.

The rear end of the drag link portion 11 may be screwed in the reduced forward end of a cylindrical casing 14, or otherwise suitably secured thereto, as by welding. The casing in its forward portion has a longitudinal axial bore 15 and the remainder of the casing extending rearwardly therefrom, is made in the form of an integral sleeve to provide a housing 16. The rear end of the housing is internally screw threaded at 17 and a clevis 18 has its reduced shank 19 screwed thereinto. The forward portion 11 of the drag link may vary in length according to different vehicle constructions. The invention being more particularly applicable to trucks and heavy motor vehicles, the drag link may be, in some instances, comparatively short and the casing 14 may constitute the major portion thereof.

The housing has a slot 20 in its outer side wall, intermediate its ends. A tubular plunger 21 has a sliding fit in the housing and is provided in its side wall, with a slot 22 coacting with the slot 20. A pair of circular bearing disks 23 and 24 are movably fitted in the bore of the plunger for receiving therebetween, the ball 25 which is mounted on the inner side of the steering arm 26, as is now in common use on motor vehicles. This arm extends through the slots 20 and 22. The rear disk 23 abuts a plug 27 screwed into the rear end of the plunger; while the front disk 24 is engaged by a coiled spring 28 confined in the bore of the plunger between said disk and the front wall of said plunger. This spring is quite heavy and is under sufficient compression to hold the disks 23 and 24 in contact with the ball 25, during all operations. The faces of the disks, adjacent the ball 25 are frusto-conical having reduced concaved seats 29 for receiving the ball 25.

The plunger 21 is slidably sustained in the housing between coiled springs 30 and 31. The spring 30 is confined between the plug 27 and the shank 19; while the spring 31 is confined between the front end of the plunger and the front wall of the housing. These springs are under sufficient compression to yield only when resistance is offered to a movement of the drag link. From the foregoing, it is apparent that the housing 14 becomes an integral part of the drag link, while the plunger 21 is resiliently sustained in the housing and movable therewith or independently thereof. Conversely when the plunger is held, the housing and drag link are movable independently of the plunger. It will be noted that the springs 30 and 31 are comparatively heavy. The spacing between the coils of these springs controls to a degree the distance the plunger 21 may be moved before the coils contact and prevent further movement of the plunger, independently of the housing 14. This makes for flexibility.

An integral plunger rod 32 extends forwardly from the plunger into the bore 15 of the casing 14, and intermediate its ends is provided with circumferential teeth 33. An upright shaft 34 is journaled in a vertical bore 35 in the housing at one side of the rod and has vertical teeth 36 on its outer surface meshing with the teeth 33, whereby said shaft is rotated upon longitudinal movement of the plunger rod. As is shown in Figures 2, 4 and 6, the casing 14 has a flat valve seat 37 on its upper side surrounding the bore 35; this seat being at right angles to the slot 20. A valve cap 38 is fastened on the seat by suitable means, as machine bolts 39 (Fig. 3). The cap and seat are shown as substantially square in plan. The underside 40 of the cap and the face of the seat 37 are finished smooth, so as to provide a fluid-tight joint therebetween.

The cap 38 has a cylindrical valve chamber 41 therein open at the underside of the cap and provided with a reduced concentric circular recess 42 at its top. A valve disk 43 is rotatably confined in the chamber and has a central upstanding stud 44. The underside or face of the disk is finished smooth to provide a fluid-tight rotating contact with the valve seat 37. Contact between the face of the disk and the valve seat is maintained by a coiled spring 45 bearing upon the disk around the stud 44 and having its upper end confined in the recess 42. A circular recess 46 is formed centrally in the underside of the valve disk for snugly receiving an annular flange 47 integral with the upper end of the shaft 34 and overlying the valve seat. An integral transverse key 48 immediately above the flange fits snugly in a complementary recess 49 in the valve disk. When the shaft 34 is rotated, the valve disk 43 is likewise rotated.

The valve seat 37 is provided with vertical ports 51, 52 and 53 disposed in an arc concentric to the bore 35 and equidistant therefrom. The central port 51 forms an exhaust port and is connected at its lower end with a vent passage 54 (Figs. 2 and 4) extending forwardly in the casing 14 and open to the atmosphere. Lateral passages 52' and 53' extend respectively from the ports 52 and 53 through the casing to the outer surface thereof.

The valve cap 38 has an internally screw threaded nipple 55 extending forwardly thereon and communicating with the space in the chamber 41 above the disk 43. As is shown in Figure 1, a flexible air feed line 56 is suitably connected to the nipple and is supported on a mounting block 57 secured to the side of the frame A of the motor vehicle. This line 56 is connected in the block to an air supply line 58 which includes a pressure regulator 59. Any suitable mechanism (not shown) may be provided for supplying air or liquid to the line 58. Such mechanisms are well known and are now in common use. By means of the foregoing connections the chamber 41 is constantly maintained full of fluid under working pressure.

The valve disk 43 has a pair of arcuately spaced ports 152 and 153 which extend entirely therethrough. An arcuate duct 151 is formed in the underside of the disk between the ports, but does not connect therewith. The ports 152 and 153 and the duct 151 are located in an arc having the same radius as the arc in which the ports 51, 52 and 53 are disposed, and at the same distance from the center of the bore 35. When the disk is in its neutral or central position as shown in Figures 2 and 6, the bottoms of the disk ports 152 and 153 are sealed by the valve seat 37 and no fluid can pass through said ports. At the same time, the duct 151 overlies the ports 51, 52 and 53, whereby the passages 52' and 53' are connected through the port 51 and vent passage 54 to the atmosphere. Thus in neutral position the ports 52 and 53 and passages 52' and 53' are open to the atmosphere.

Referring again to Figures 1 and 4, it will be seen that the passage 52' is connected to a flexible air line 62, while the passage 53' is connected to a flexible air line 63, both being supported in the mounting block 57 and connected respectively to air lines 162 and 163. The line 162 is connected to the forward end of the usual air cylinder 60 which is mounted on the frame A of the vehicle; while the line 163 is connected to the rear end of said cylinder. The cylinder has the usual piston head 61 therein from which the piston rod 64 extends forwardly through the front head of the cylinder. A pitman 65 is connected at its rear end by a universal joint 66 with the forward end of the piston rod; while the forward end of the pitman is connected by a universal joint 67 with the clevis 18 of the drag link. It is pointed out that the entire air power system, exclusive of the improved drag link may be of any approved form and the invention is not restricted thereto. Also the air valve carried by the casing 14 may be of any suitable construction, so long as it will control the supply and exhaust of air in response to movements of the drag link elements.

In describing the operation, it will be assumed that the disk valve 43 is in neutral position, whereby the air lines 163, 63, 62 and 162 and passages 52' and 53' are open to the atmosphere, by reason of the duct 151 overlying the ports 51, 52 and 53 and thus being connected in common with the vent passage 54. The steering wheel B of the motor vehicle will be in its straitaway driving position, the steering arm 26 perpendicular and the front wheels 13 in normal driving position. Air under pressure is supplied by the lines 58 and 56 to the chamber 41 of the valve cap 38 and fills said chamber and the ports 152 and 153, but cannot escape because the bottoms of said ports are sealed by the valve seat 37. The piston 61 will be in its central position.

If the driver turns the steering wheel B to the right or clockwise the arm 26 will be swung rearwardly. Owing to the frictional load placed upon tires of the front wheels 13, rearward movement of the drag link 10, including portion 11 and casing 14, will be resisted and consequently the plunger 21 will be independently moved rearwardly against the compression of the spring 30. Such rearward movement of the plunger will cause its rod 33 to rotate the shaft 34 in a counter-clockwise direction by reason of the meshing of the teeth 33' and 36 whereby the valve disk 43 will be turned counter-clockwise.

When the valve disk 43 is turned counter-clockwise, the duct 151 will be moved out of communication with port 52, but will maintain communication with the port 53, whereby the lines 162 and 63 leading from the rear end of the cylinder will still be open to the atmosphere. At the same time the port 152 will be moved into communication with port 52, whereby fluid will flow through port 52, passage 52' and lines 62 and 162 to the forward end of the air cylinder 60. The port 153 will remain seated by the valve seat.

When air is admitted to the front of the cylinder 60, the piston head 61 will be forced rearwardly whereby the drag link 10 will be pulled rearwardly and the steering linkage 12 operated to swing the front wheels 13 to the right. If the driver does not continue to turn the steering wheel B to the right, the rearward movement of the casing 14 by the piston 61 of the power mechanism will cause the plunger 21 to remain relatively stationary, whereby the shaft 34 will be rotated clockwise and the valve disk 43 likewise rotated clockwise which will restore it to its neutral position. During the rearward movement of the drag link the compression of the spring 30 will be reduced, but said spring will act to prevent the plunger following the casing 14 rearwardly. When the valve disk 43 reaches its neutral position, the compression of the springs 30 and 31 will be substantially equalized.

However should the driver continue to turn the steering wheel to the right the plunger 21 will move rearwardly with the casing 14, or lag or precede said casing, according to the torque of the steering wheel mechanism as applied by the driver. It is pointed out that at no time is the driver called upon to supply the energy to actually turn the front wheels 13; that he can substantially "feel" the resistance offered to the torque of the steering wheel and thus has a sensitive and positive steering control. He can control the supply of air to the point where the wheels will be turned gradually or rapidly, or where they may be under constant turning pressure, as in an effort to swing said wheels out of a rut. His entire expenditure of force is confined to the actuation of the air valve. It will also be observed that so long as the compression of the springs 30 and 31 is substantially equalized, the plunger 21 and the valve disk 43 will remain in a neutral position regardless of the position of the drag link.

If the driver should continue to turn the steering wheel to the right sufficiently to continue the counterclockwise turning of the disk 43, the port 152 will be moved into communication with the port 51, whereby air flowing from port 152 will be exhausted to the atmosphere and injury to the mechanism prevented. The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A motor vehicle drag link including, a casing, a member slidable in the casing, heavy coiled springs confined in the casing under compression and engaging the opposite ends of said member, whereby the member may undergo a limited sliding movement, each of said springs becoming fully compressed when the member reaches the end of its limited sliding movement in the direction of said spring, whereby the casing is moved longitudinally against the steering load, yieldable means for connecting the slidable member with the steering arm of a motor vehicle, and a fluid supply valve operably connected directly with said sliding member.

2. A motor vehicle drag link as set forth in claim 1, wherein the fluid supply valve includes a rotatable valve disk having rotation means directly driven by the slidable member and fluid ports coacting with said disk together with means for bleeding the supply of fluid to the atmosphere controlled by said disk.

3. A motor vehicle drag link including, a casing connected in the drag link, a tubular plunger slidably mounted in the casing, resilient means in the casing and between which the plunger is confined, yieldable means within the plunger for receiving the ball of a steering arm, a fluid supply valve carried by the casing, and an operating connection between the plunger and the valve.

4. A motor vehicle drag link including, a casing connected in the drag link, a tubular plunger slidably mounted in the casing, resilient means in the casing and between which the plunger is confined, yieldable means within the plunger for receiving the ball of a steering arm, a plunger rod connected with the plunger and extending therefrom provided with gear teeth, a fluid supply valve carried by the casing and including a rotating disk, and a gear shaft connected with the disk of said valve and geared to the plunger rod.

5. A motor vehicle drag link including, a casing connected in the drag link and having a slot for receiving the steering arm of a motor vehicle, a tubular plunger slidable in the casing and having a slot for receiving the steering arm of a motor vehicle, yieldable means within the plunger for receiving the ball of a steering arm, a fluid supply valve carried by the casing, and an operating connection between the plunger and the valve.

6. In a motor vehicle steering apparatus the combination of a drag link, a casing connected in the drag link, a member slidable in the casing, resilient means in the casing between which the slidable member is confined, a connection between the steering arm and the slidable member, a fluid supply valve carried by the casing, and an operating connection between the slidable member and the valve independent of the steering arm.

7. In a motor vehicle steering apparatus the combination of, a steering arm, a drag link, a casing adapted to be connected to the drag link, a plunger slidable in the casing, coiled springs in the casing between which the plunger is confined, a connection between the steering arm and the plunger, a fluid supply valve carried by the casing, and a positive operating connection between the plunger and the valve.

LEONARD C. BOWLING.